US008245834B2

(12) United States Patent
Okubo et al.

(10) Patent No.: US 8,245,834 B2
(45) Date of Patent: Aug. 21, 2012

(54) TRANSPORT SYSTEM

(75) Inventors: Hiroshi Okubo, Shinagawa-ku (JP); Hirofumi Kinoshita, Shinagawa-ku (JP); Hiroshi Hori, Shinagawa-ku (JP); Tsugumitsu Kandabashi, Kumamoto (JP)

(73) Assignee: Hirata Corporation, Shinagawa-Ku, Tokyo (JP)

( * ) Notice: Subject to any disclaimer, the term of this patent is extended or adjusted under 35 U.S.C. 154(b) by 473 days.

(21) Appl. No.: 12/306,316

(22) PCT Filed: Jun. 8, 2007

(86) PCT No.: PCT/JP2007/061649
§ 371 (c)(1),
(2), (4) Date: Dec. 23, 2008

(87) PCT Pub. No.: WO2007/148547
PCT Pub. Date: Dec. 27, 2007

(65) Prior Publication Data
US 2009/0183969 A1    Jul. 23, 2009

(30) Foreign Application Priority Data

Jun. 23, 2006    (JP) .................................. 2006-174414

(51) Int. Cl.
*B65G 43/08* (2006.01)
(52) U.S. Cl. ........................................ 198/358; 198/349
(58) Field of Classification Search .................. 198/349, 198/349.8, 349.9, 358
See application file for complete search history.

(56) References Cited

U.S. PATENT DOCUMENTS 4,831,540 A * 5/1989 Hesser ........................... 700/113
5,080,019 A * 1/1992 Takemura et al. ........... 104/88.03
(Continued)

FOREIGN PATENT DOCUMENTS

JP        4-236608 A    8/1992
(Continued)

OTHER PUBLICATIONS

Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/061649, Jan. 15, 2009, The International Bureau of WIPO, Geneva, CH.

(Continued)

*Primary Examiner* — Gene Crawford
*Assistant Examiner* — William R Harp
(74) *Attorney, Agent, or Firm* — Buchanan Ingersoll & Rooney PC

(57) ABSTRACT

A transport system of this disclosure includes a transporter for forming a plurality of transport paths from a transport source to a transport destination and transporting a work via a transport path selected from the plurality of transport paths, a controller for controlling the transport, and a reader for, when the work has arrived at a branch point in the transport path, reading out, from a storage medium, transport path information representing a transport direction of the work at the branch point in the transport path, the storage medium being provided on the work and storing the transport path information. The controller controls the transport to transport the work in the transport direction of the work at the branch point represented by the transport path information read out by the reader.

10 Claims, 11 Drawing Sheets

U.S. PATENT DOCUMENTS

| | | | | |
|---|---|---|---|---|
| 5,111,750 | A * | 5/1992 | Nozaki et al. | 104/88.03 |
| 5,321,619 | A * | 6/1994 | Matsuda et al. | 700/116 |
| 5,374,231 | A * | 12/1994 | Obrist | 483/15 |
| 5,577,596 | A * | 11/1996 | Van Essen | 198/349 |
| 6,425,477 | B1 * | 7/2002 | Karasawa | 198/575 |
| 6,622,845 | B1 * | 9/2003 | Heinrich et al. | 198/349 |
| 6,854,583 | B1 * | 2/2005 | Horn | 198/348 |
| 6,959,229 | B2 * | 10/2005 | Eidemiller | 700/226 |
| 7,421,307 | B2 * | 9/2008 | Dolansky et al. | 700/159 |
| 2005/0065642 | A1 * | 3/2005 | Brixius et al. | 700/230 |

FOREIGN PATENT DOCUMENTS

| | | |
|---|---|---|
| JP | 7-112818 A | 5/1995 |
| JP | 7-287729 A | 10/1995 |
| JP | 9-255114 A | 9/1997 |
| JP | 10-147405 A | 6/1998 |
| JP | 2000-117594 A | 4/2000 |
| JP | 2001-335148 A | 12/2001 |
| JP | 2006-312514 A | 11/2006 |
| WO | WO 2005091092 A2 * | 9/2005 |

OTHER PUBLICATIONS

International Search Report for PCT/JP2007/061649, completed Jul. 5, 2007 (in Japanese).

Written Opinion of the International Searching Authority for PCT/JP2007/061649, completed Jul. 5, 2007 (in Japanese).

* cited by examiner

| ADDRESS | DATA |
|---|---|
| 0000 | A210 |
| 0001 | 1001 |
| ... | ... |
| ... | ... |
| 1001 | S |
| 1002 | E |
| 1003 | E |
| 1004 | S |
| 1005 | E |
| 1006 | E |
| ... | ... |
| ... | ... |

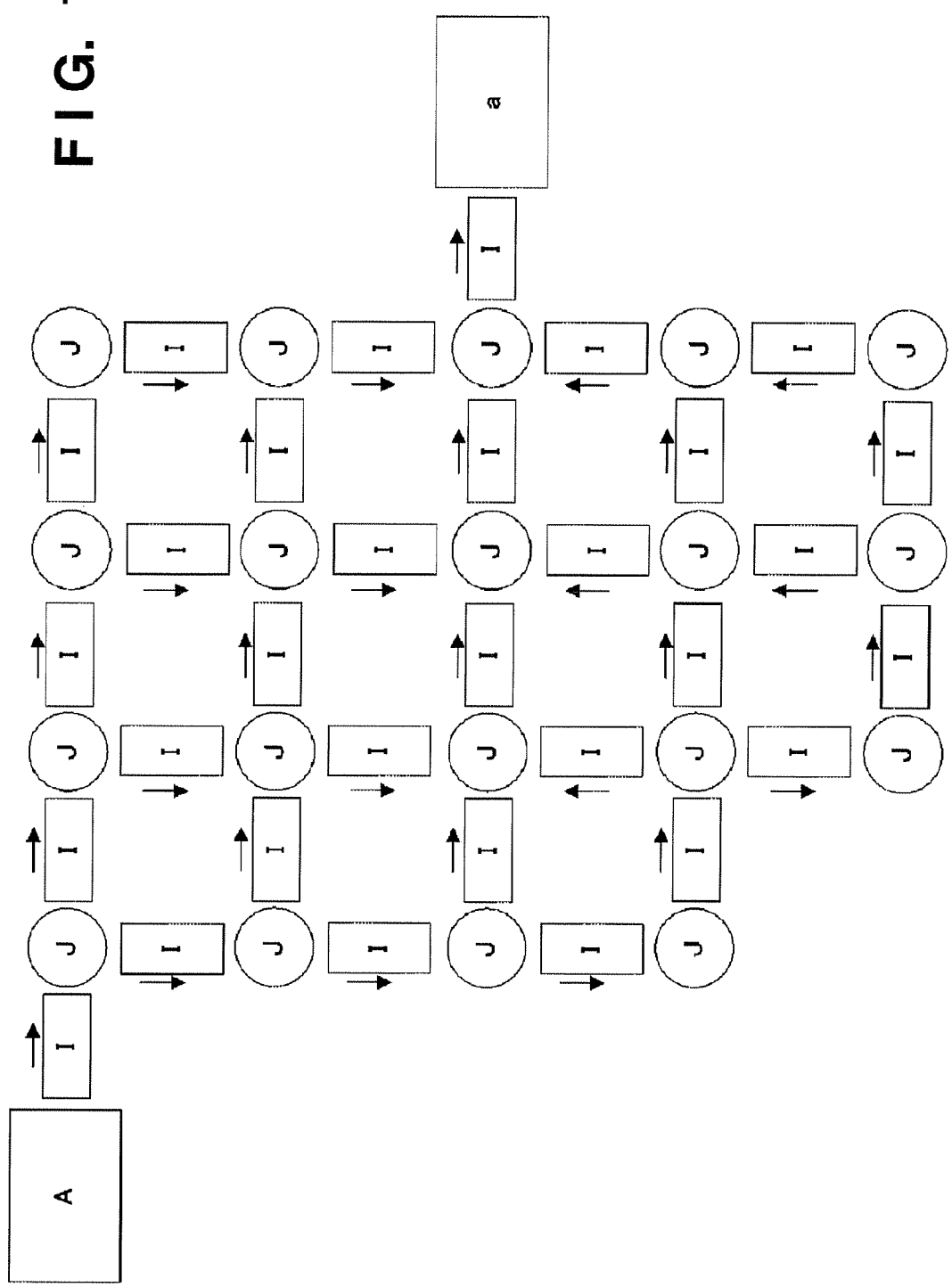

TRANSPORT SYSTEM

TECHNICAL FIELD

The present invention relates to a transport system for transporting an object to be transported such as a work.

BACKGROUND ART

In the production facilities of a semiconductor manufacturing system or the like, a substrate that is a work undergoes a plurality of kinds of processes. To do this, production facilities of this type must sequentially efficiently transport a work through a plurality of processing apparatuses.

For example, Japanese Patent Laid-Open No. 9-255114 discloses a conventional transport system in which a host computer unitarily manages transport paths and executes transport control of each transport unit. Japanese Patent Laid-Open No. 7-287729 discloses a system which adds a barcode to each object to be inspected as an object to be transported to identify it. A conveyor reads the barcode and selectively transports each object to be inspected to an inspection apparatus or another conveyor. Japanese Patent Laid-Open No. 2000-117594 discloses a system which adds an ID tag to each work and writes information about process control of the work in the ID tag at the start of the production line. Transport information about the type of each process the work should undergo is written in the ID tag. The work is transported through the processes via a path complying with the transport information.

In a system having only one transport path from a transport source to a transport destination, if the transport equipment is partially faulty, or the work transport delays in the transport path, the work transport is completely tied up, resulting in a large decrease in the work transport efficiency. This leads to a decrease in the operating ratio of, for example, a processing apparatus of the transport destination and a decrease in the production efficiency of the whole production facilities. This problem can be solved by forming a plurality of transport paths from the transport source to the transport destination and appropriately selecting one of them for each work.

However, when a plurality of transport paths are formed between a transport source and a transport destination in the system in which a host computer unitarily manages the transport path of each work, it is necessary to cause the host computer to designate the transport direction of a work at each branch point of the transport path. The load on the host computer becomes too heavy when simultaneously transporting many works.

On the other hand, in the system described in Japanese Patent Laid-Open No. 7-287729 or 2000-117594, which adds a barcode or ID tag to each work, and performs transport control of each work by reading information recorded in the barcode or ID tag, the load on the host computer can be lighter. However, the technique disclosed in Japanese Patent Laid-Open No. 7-287729 records the type of each work (object to be inspected) in a barcode and is usable only in a system which uniquely determines a transport path in accordance with the type of a work. The technique disclosed in Japanese Patent Laid-Open No. 2000-117594 records, in an ID tag, processes each work should undergo and is usable only in a system which uniquely determines a transport path to each process.

DISCLOSURE OF INVENTION

It is an object of the present invention to improve the transport efficiency and reduce the load on the host computer.

According to the present invention, there is provided a transport system comprising transport means for forming a plurality of transport paths from a transport source to a transport destination and transporting a work via a transport path selected from the plurality of transport paths, control means for controlling the transport means, and read means for, when the work has arrived at a branch point in the transport path, reading out, from a storage medium, transport path information representing a transport direction of the work at the branch point in the transport path, the storage medium being provided on the work and storing the transport path information, wherein the control means controls the transport means to transport the work in the transport direction of the work at the branch point represented by the transport path information read out by the read means.

In the transport system of the present invention, the transport means forms a plurality of transport paths from a transport source to a transport destination. Since a plurality of choices exist as the transport path of the work, the work transport efficiency can be increased. Transport control of the work is performed based on the transport path information stored in the storage medium provided on the work. It is therefore possible to reduce the load on the host computer as compared to a system which causes the host computer to unitarily manage work transport paths and execute control. Since the transport path information represents the transport direction of the work at a branch point in the transport path, processing of setting the work transport direction at the branch point is unnecessary, and the transport control processing can be simplified. Additionally, the system can flexibly cope with a change in the system layout.

BRIEF DESCRIPTION OF DRAWINGS

FIG. 11 is a view showing still another example of the layout of the transport equipment 10.

BEST MODE FOR CARRYING OUT THE INVENTION

An embodiment of the present invention will now be described with reference to the accompanying drawings. FIG.

Figure 1:
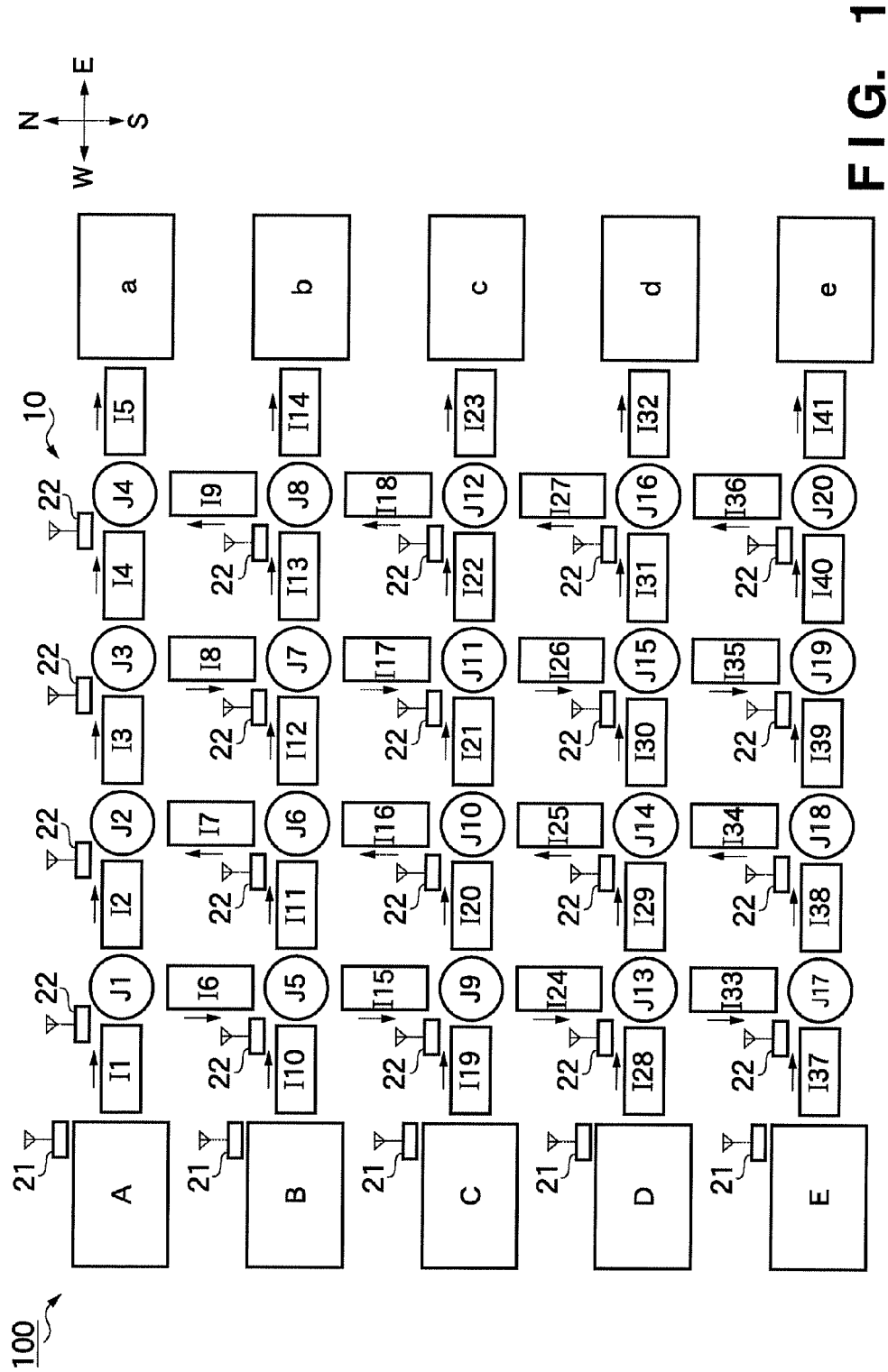
FIG. 1 is a view showing the layout of a transport equipment 10 of a work transport system 100 according to an embodiment of the present invention.

1 is a view showing the layout of a transport equipment 10 of a work transport system 100 according to an embodiment of the present invention. Referring to FIG. 1, each of apparatuses A to E is the transport source of a work serving as an object to be transported, and, for example, a processing apparatus for processing a work or a stocker for temporarily storing a work. Each of apparatuses a to e is the transport destination of a work serving as an object to be transported, and, for example, a processing apparatus for processing a work or a stocker for temporarily storing a work.

The transport equipment 10 includes a plurality of work transport units I1 to I41 and J1 to J20 (to be collectively referred to as work transport units I and J hereinafter). In FIG. 1, N, S, E, and W represent orientations in the factory where the transport equipment 10 is installed. The plurality of work transport units I1 to I41 and J1 to J20 are arranged in a matrix along the directions.

The work transport units I1 to I41 and J1 to J20 are arranged at the branch points of transport paths and include the branch-point work transport units J1 to J20 (to be collectively referred to as branch-point transport units J hereinafter) capable of changing the work transport direction, and the unidirectional work transport units I1 to I41 (to be collectively referred to as unidirectional transport units I hereinafter) which transport a work in one direction (indicated by an arrow in FIG. 1).

The transport equipment 10 includes the combination of the branch-point transport units J and the unidirectional transport units I and can therefore select one of a plurality of transport paths to transport a work from one of the apparatuses A to E as a transport source to one of the apparatuses a to e as a transport destination. For example, when transporting a work from the apparatus A to the apparatus a, it is possible to select, for example, a transport path of the work transport units I1→J1→I2→J2→I3→J3→I4→J4→I5 or a transport path of the work transport units I1→J1→I6→J5→I11→J6→I16→J10→I21→J11→I22→J12→I18→J8→I9→J4→I5.

As described above, the transport equipment 10 forms a plurality of transport paths from one transport source to one transport destination. Since a plurality of choices exist as a work transport path, the work transport efficiency can be increased.

The work transport system 100 includes readers/writers 21 arranged for the apparatuses A to E, respectively, and readers/writers 22 arranged for the branch-point transport units J, respectively. The readers/writers 21 and 22 read out or write data from or in a memory provided in a wireless IC tag. The antenna of each reader/writer 21 is arranged at a position where it is possible to execute data read/write for the memory of a wireless IC tag provided in a pod 1 (to be described later) which is unloaded from a corresponding one of the apparatuses A to E. The antenna of each reader/writer 22 is arranged at a position where it is possible to execute data read/write for the memory of the wireless IC tag provided in the pod 1 on a corresponding one of the branch-point transport units J.

Figure 2A:
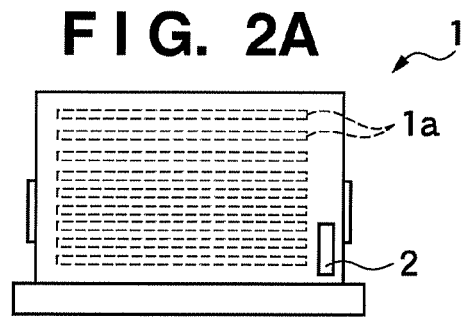
FIG. 2A is a schematic view of a pod 1.

FIG. 2A is a schematic view of the pod 1 which is an object to be transported according to the embodiment. In this embodiment, a substrate 1a is transported as a work. Assume that a plurality of substrates 1a is stored in the pod 1 serving as a container, and each pod 1 is transported. The pod 1 has a hollow box shape capable of storing a plurality of substrates 1a. When the apparatuses A to E and the apparatuses a to e are the processing apparatuses of the substrate 1a, each apparatus opens the pod 1 that has arrived, takes out each substrate 1a, and executes predetermined processing for each substrate 1a taken out. When the processing has finished, the substrate 1a is returned to the pod 1. The pod 1 is sealed.

Figures 4A, 4B:
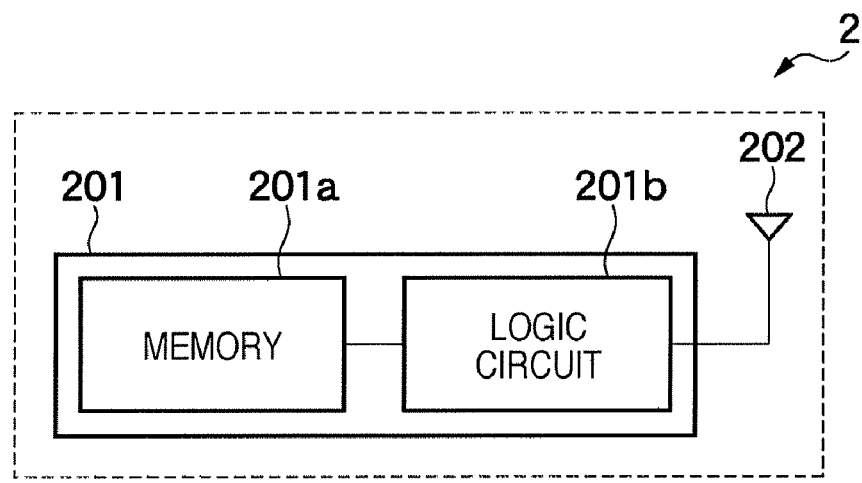
FIG. 4A is a block diagram of a wireless IC tag 2.
FIG. 4B is a view showing example of information recorded in a memory 201a of the wireless IC tag 2.

A wireless IC tag 2 is attached to a side surface of the pod 1. FIG. 4A is a block diagram of the wireless IC tag 2. The wireless IC tag 2 includes an IC chip 201 and an antenna 202. The IC chip 201 includes a logic circuit 201b and a memory 201a. When the antenna 202 receives a signal from the reader/writer 21 or 22, the wireless IC tag 2 wirelessly communicates with the reader/writer 21 or 22 using power generated by the received signal and transmits information stored in the memory 201a or stores information in the memory 201a. In this embodiment, the memory 201a serves as a storage medium that stores the transport path information of the pod 1.

FIG. 4B is a view showing example of information recorded in the memory 201a of the wireless IC tag 2. An ID uniquely given to each pod 1 to identify it is stored at address 0000. Pieces of transport path information each representing the transport direction of the pod 1 at a branch point of a transport path are stored from address 1001 (addresses 1001 to 1006). In this embodiment, transport path information represents the transport direction of the pod 1 for each branch-point transport unit J through which the pod 1 should pass. The pieces of transport path information are stored at storage addresses which are set in the order of branch-point transport units J through which the pod 1 should pass.

More specifically, in this embodiment, the transport directions in the transport path information are represented by the orientations N, S, E, and W in the factory where the transport equipment 10 is installed. The pieces of transport path information of the example shown in FIG. 4B represents that the pod 1 should be transported via a transport path of the transport units I1→J1→I6→J5→I11→J6→I12→J7→I17→J11→I22→J12→I23. The transport direction (S) of the branch-point transport unit J1 is stored at address 1001. The transport direction (E) of the branch-point transport unit J5 is stored at address 1002. The transport direction (E) of the branch-point transport unit J6 is stored at address 1003. The transport direction (S) of the branch-point transport unit J7 is stored at address 1004. The transport direction (E) of the branch-point transport unit J11 is stored at address 1005. The transport direction (E) of the branch-point transport unit J12 is stored at address 1006.

A pointer to refer to the storage address of transport path information is stored at address 0001 of the memory 201a. As the initial value of the pointer, the storage address of transport path information corresponding to the first branch-point transport unit through which the pod 1 should pass is set. In the example in FIG. 4B, address 1001 is set as the initial value. Every time the pod 1 passes through a branch-point transport unit J, the reader/writer 22 arranged for the branch-point transport unit J updates the pointer and increments the address value.

The unidirectional transport unit I and the branch-point transport unit J will be described next. These work transport units are stationarily installed work transport units. In this embodiment, various transport paths are implemented by actually combining the two kinds of work transport units. A plurality of kinds of work transport units can be employed, as a matter of course. However, reducing the number of types of work transport units suppresses the cost of the entire system and facilitates the work transport control.

Figure 2B:
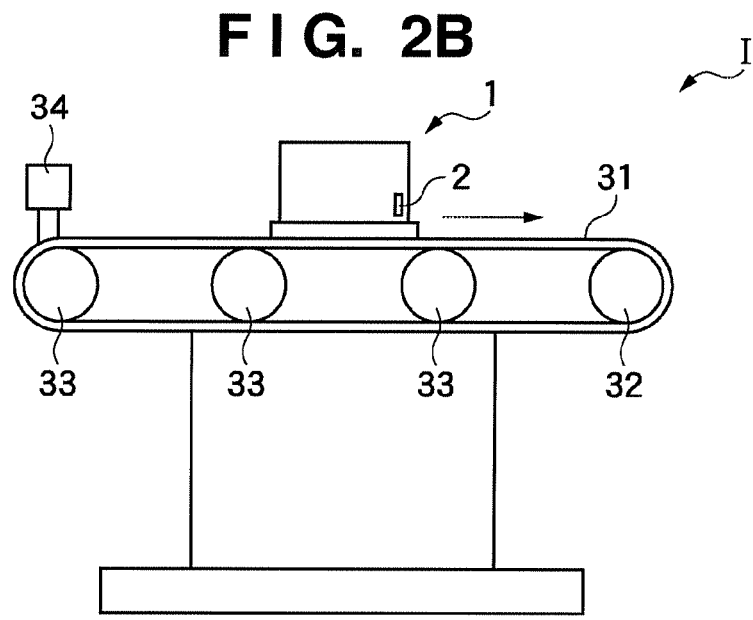
FIG. 2B is a view showing the schematic arrangement of a unidirectional transport unit I.

FIG. 2B is a view showing the schematic arrangement of the unidirectional transport unit I. In this embodiment, the unidirectional transport unit I is a belt conveyor type transport unit including an endless belt 31, a driving roller 32 which is driven and rotated by a driving source (not shown), and idle rollers 33. The belt 31 travels as the driving roller 32 rotates, thereby transporting the pod 1 on the belt 31. A sensor 34 is arranged at an end on the loading side of the unidirectional transport unit I. The sensor 34 detects load of the pod 1 into the unidirectional transport unit I and is formed from, for example, an infrared sensor.

Figure 2C:
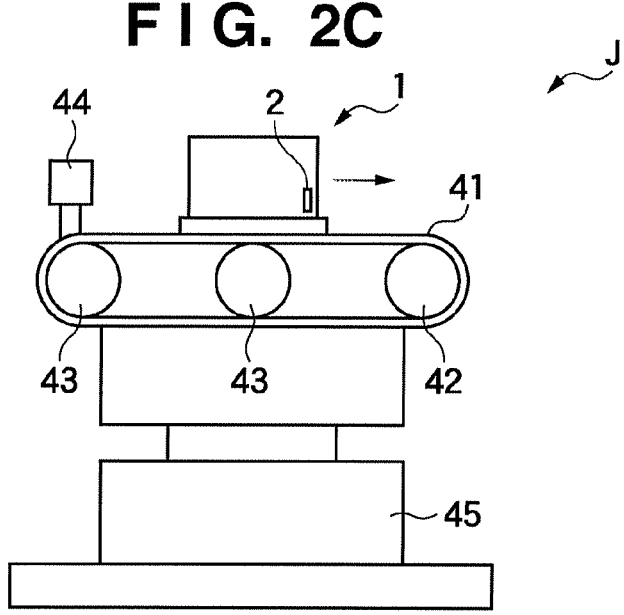
FIG. 2C is a view showing the schematic arrangement of a branch-point transport unit J.

FIG. 2C is a view showing the schematic arrangement of the branch-point transport unit J. In this embodiment, the branch-point transport unit J is a belt conveyor type transport unit including an endless belt 41, a driving roller 42 which is driven and rotated by a driving source (not shown), and idle rollers 43. The belt 41 travels as the driving roller 42 rotates, thereby transporting the pod 1 on the belt 41. A sensor 44 is arranged at an end on the loading side of the branch-point transport unit J. The sensor 44 detects load of the pod 1 into the branch-point transport unit J and is formed from, for example, an infrared sensor. The branch-point transport unit J also includes a motor-driven turning unit 45. The turning unit 45 turns the whole belt conveyor portion (41 to 44) above it in steps of 90° to change the transport direction of the pod 1.

Figure 9:
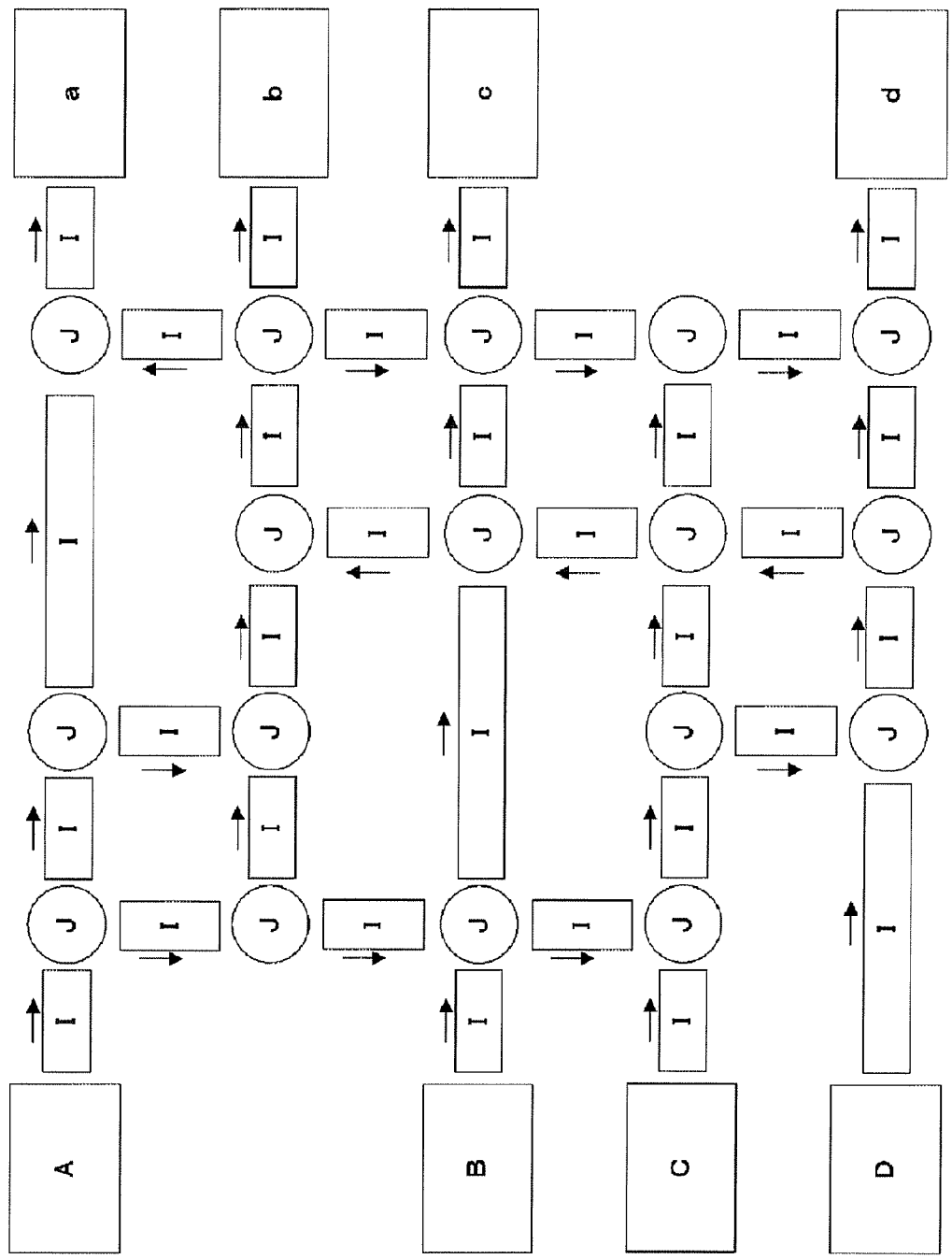
FIG. 9 is a view showing another example of the layout of the transport equipment 10.
Figure 10:
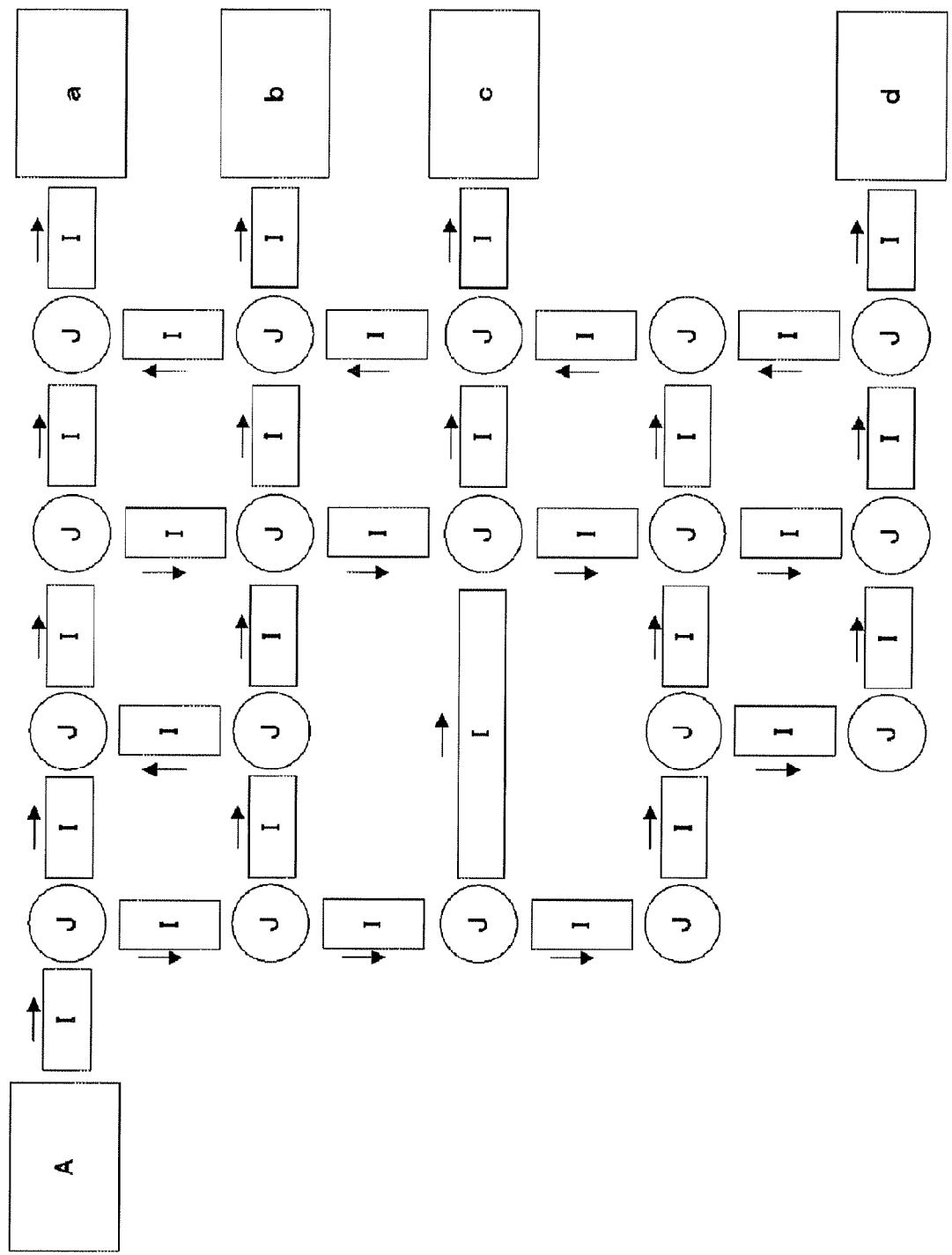
FIG. 10 is a view showing still another example of the layout of the transport equipment 10.

The layout of the transport equipment 10 shown in FIG. 1 is merely an example, and various layouts can be adopted. FIGS. 9 to 11 are views showing other examples of the layout of the transport equipment 10. In the layout example shown in FIG. 9, the work transport units I and J are arranged in a non-matrix pattern between the apparatuses A to D and the apparatuses a to d. The example shown in FIG. 9 also includes unidirectional transport units I having a different transport length. In the layout example shown in FIG. 10, one apparatus A serves as a transport source, and the plurality of apparatuses a to d serve as transport destinations. In the layout example shown in FIG. 11, one apparatus A serves as a transport source, and one apparatus a serves as a transport destination.

This embodiment assumes that a work is transported between two apparatus groups, that is, between the group of the apparatuses A to E and the group of the apparatuses a to e. However, a layout for transporting a work between three or more apparatus groups can also be employed.

In this embodiment, the transport equipment 10 includes the stationarily installed work transport units I and J. However, the transport means capable of transporting a work via a plurality of transport paths is not limited to this. For example, a self-propelled transport unit can also be employed.

<Control Block>

Figure 3:
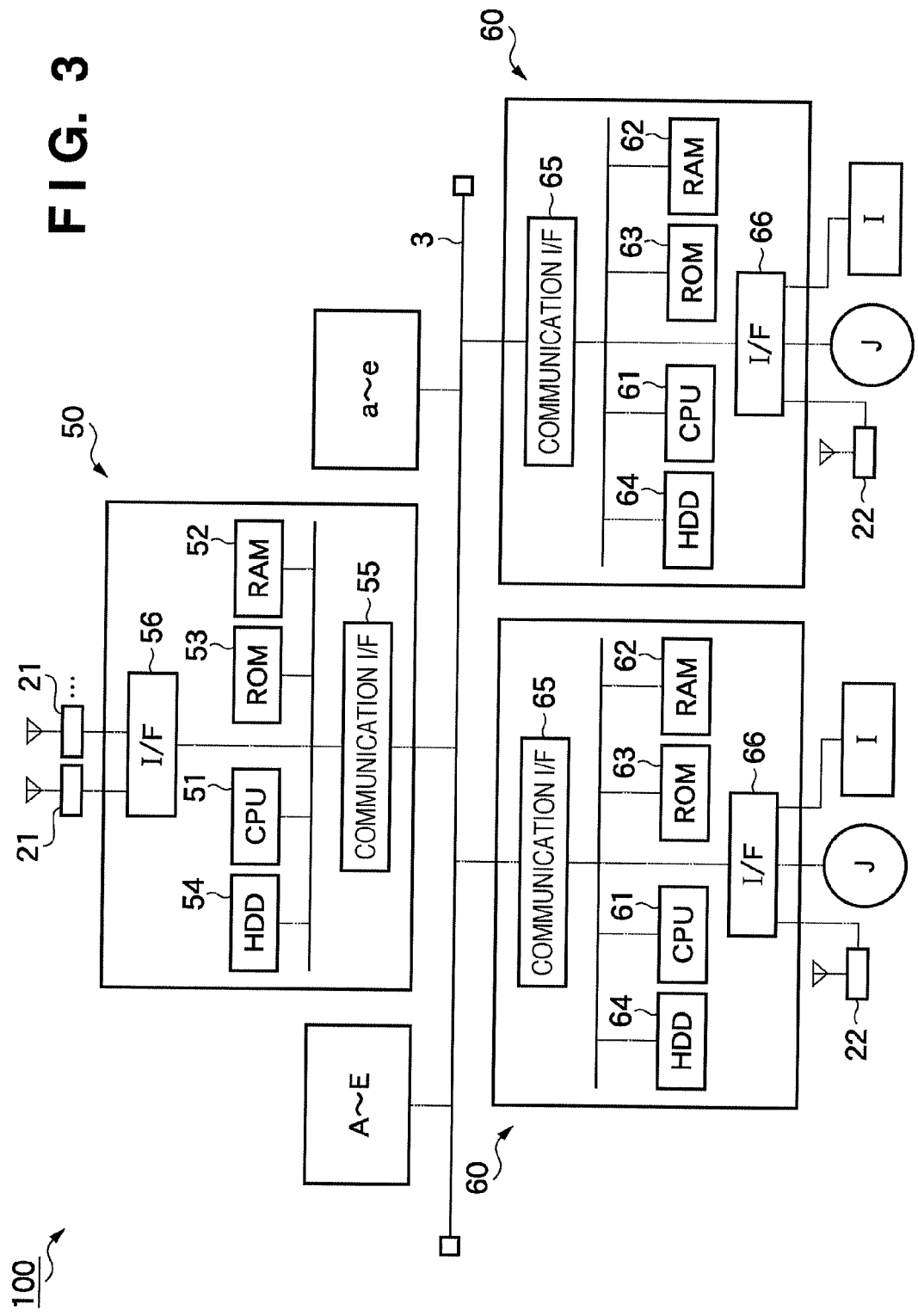
FIG. 3 is a block diagram of the control system of a work transport system 100.

FIG. 3 is a block diagram of the control system of the work transport system 100 according to this embodiment. The work transport system 100 of this embodiment includes a host computer 50, and control units 60 for controlling the work transport units I and J. The host computer 50 and the control units 60 are designed to perform information communication with each other via a communication channel 3 such as a LAN. The apparatuses A to E and a to e are also connected to the communication channel 3. The host computer 50 and the control units 60 are also designed to perform information communication with the apparatuses A to E and a to e.

The host computer 50 includes a CPU 51, a RAM 52 which stores temporal data, a ROM 53 which stores permanent data and programs, an HDD (hard disk drive) 54 which stores control programs and permanent data such as information about the layout of the transport equipment 10 and management information of processes of each pod 1, a communication I/F 55 serving as an interface to the communication channel 3, and an I/F 56 serving as an interface to the reader/writer 21.

Each control unit 60 includes a CPU 61, a RAM 62 which stores temporal data, a ROM 63 which stores permanent data and programs, an HDD (hard disk drive) 64 which stores control programs and the like, a communication I/F 65 serving as an interface to the communication channel 3, and an I/F 66 serving as an interface to the reader/writer 22 and the work transport units I and J.

In this embodiment, a plurality of control units 60 are arranged to control the plurality of work transport units I and J. Each control unit 60 acquires detection results from the sensors 34 and 44 and executes driving control of the motors provided in the work transport units I and J. The reader/writer 22 corresponds to the branch-point transport unit J controlled by the control unit 60.

<Operation of System>

The operation of the work transport system 100 when transporting the pod 1 from one of the apparatuses A to E to one of the apparatuses a to e will be described next. In this embodiment, when one of the apparatuses A to E is going to transport the pod 1 to one of the apparatuses a to e, the apparatus specifies the pod 1 and transmits a transport request to the host computer 50 via the communication channel 3. When the pod 1 has arrived at one of the apparatuses a to e, the apparatus specifies the pod 1 and notifies the host computer 50 via the communication channel 3 that transport has ended.

Figure 5:
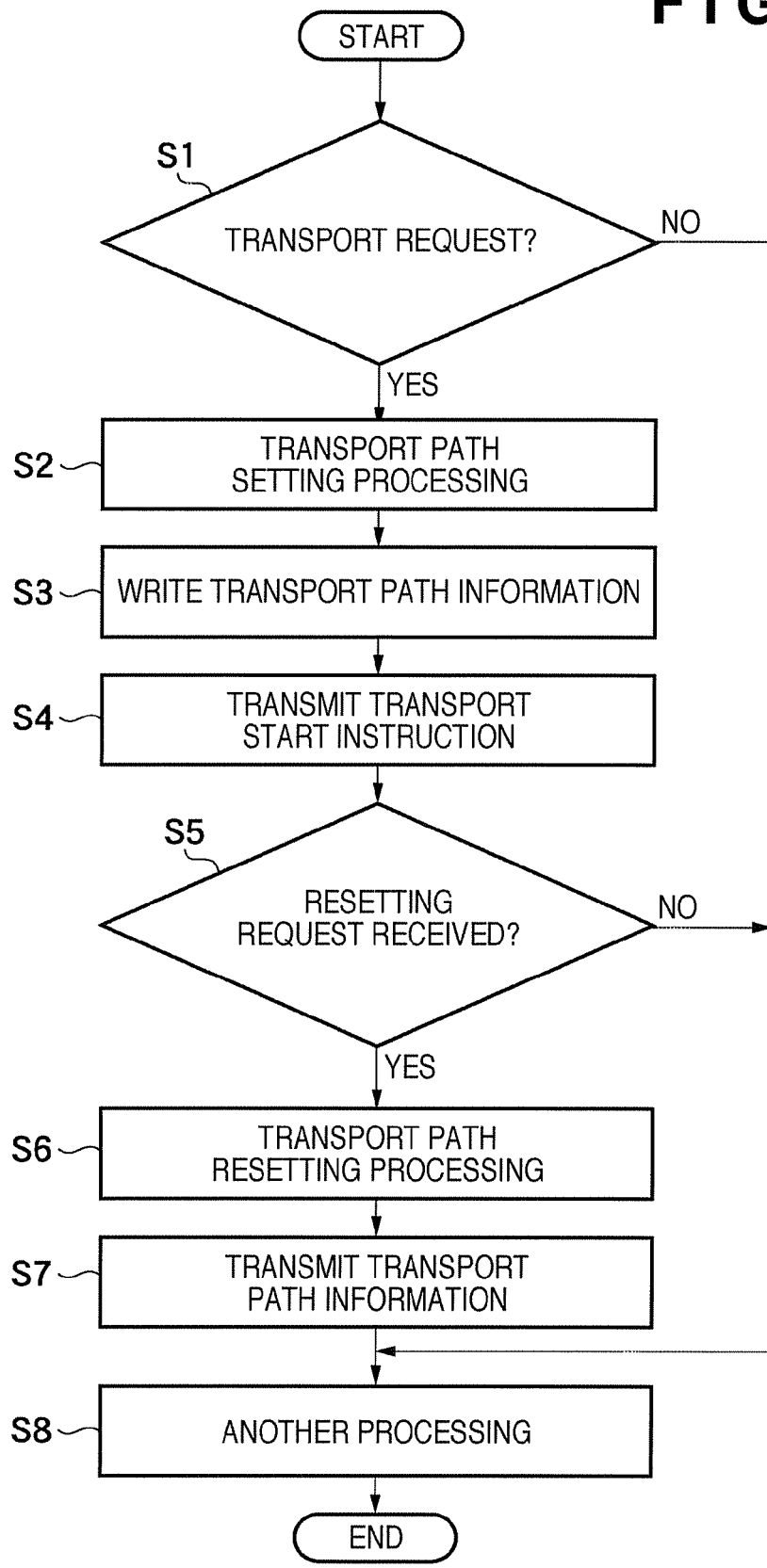
FIG. 5 is a flowchart illustrating processing to be executed by a CPU 51 of a host computer 50.

FIG. 5 is a flowchart illustrating processing to be executed by the CPU 51 of the host computer 50. In step S1, the CPU 51 determines whether a transport request of the pod 1 is received from one of the apparatuses A to E. If YES in step S1, the process advances to step S2. Otherwise, the process advances to step S8. In step S2, the transport path of the pod 1 as the target of the transport request is set. The transport path is set by selecting, for example, a transport path with less interference with the pods 1 that are being transported from a plurality of transport paths that can lead to one of the apparatuses a to e as the transport destination. The set transport path is stored in the HDD 54 together with the ID of the pod 1.

In step S3, transport path information is generated in accordance with the transport path set in step S2 and written, by the reader/writer 21, in the memory 201a of the wireless IC tag 2 attached to the pod 1 as the object to be transported. The initial value of the pointer is also written. That is, the reader/writer 21 functions as a write means for writing the transport path information based on the transport path set by the host computer 50 in the memory 201a at one of the apparatuses A to E serving as the transport source.

In step S4, a transport start instruction is transmitted, via the communication channel 3, to one of the apparatuses A to E which has sent the transport request. The apparatus which has received the transport start instruction sends the pod 1 to the transport equipment 10.

Steps S5 to S7 are processes associated with resetting of the transport path of the pod 1 during transport. This will briefly be described. In this embodiment, if it is difficult to transport the pod 1 via the transport path set first, the control unit 60 specifies the pod 1 and transmits a transport path resetting request to the host computer 50 via the communication channel 3. Transport is difficult when congestion due to transport of another pod 1 has occurred in the transport path set first, or some of the work transport units I and J in the transport path are faulty. In this embodiment, the transport path is changed in such a case, thereby implementing smooth transport of the pod 1.

In step S5, the CPU 51 determines whether a transport path resetting request is received from the control unit 60. If YES in step S5, the process advances to step S6. Otherwise, the process advances to step S8. In step S6, the transport path of the pod 1 as the target of the transport path resetting request is reset. The transport path is set by selecting, for example, a transport path which is different from the first transport path from a plurality of transport paths that can lead from the current position of the pod 1 to one of the apparatuses a to e as the transport destination. The set transport path is stored in the HDD 54 together with the ID of the pod 1 (the first transport path is updated). In step S7, transport path information is generated in accordance with the transport path reset in step S6 and transmitted, via the communication channel 3, to the control unit 60 which has transmitted the resetting request.

In step S8, another processing is executed. For example, upon receiving a notification representing the end of transport from one of the apparatuses a to e via the communication channel 3, the setting of the transport path of the pod 1 is deleted from the HDD 54. The processing of one unit is thus ended. The CPU 51 returns to step S1 to repeat the same processing as described above.

Figure 6:
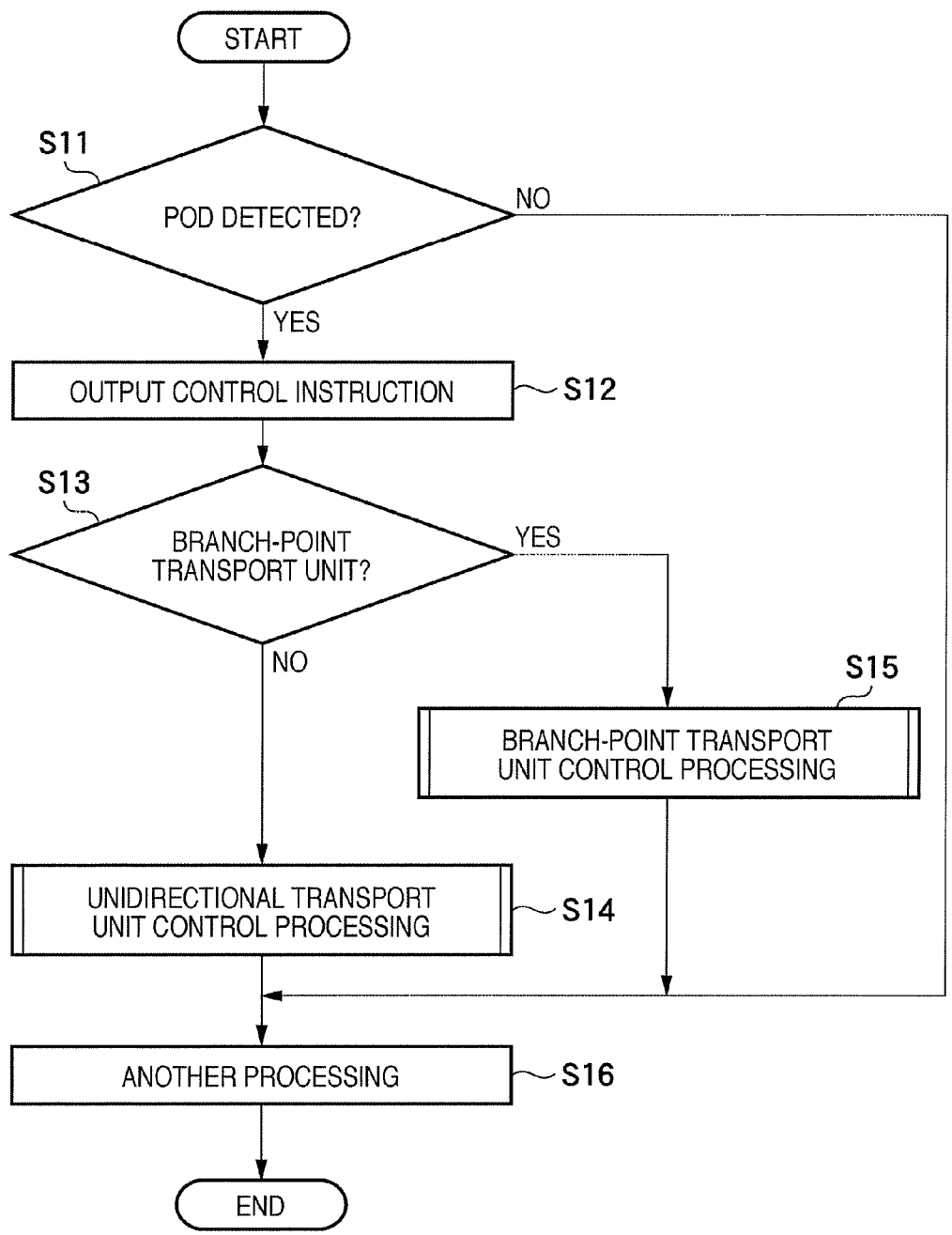
FIG. 6 is a flowchart illustrating processing to be executed by a CPU 61 of each control unit 60.

Processing to be executed by the CPU 61 of each control unit 60 will be described next. FIG. 6 is a flowchart illustrating processing to be executed by the CPU 61 of each control unit 60. In step S11, the CPU 61 determines whether the sensor 34 or 44 of one of the work transport units I and J to be controlled by the control unit 60 has detected the pod 1. If YES in step S11, the process advances to step S12. Otherwise, the process advances to step S16.

In step S12, a control instruction to travel the belt 31 or 41 is output to the work transport unit I or J that has detected the pod 1. The control instruction temporarily moves the pod 1 to the reference position at the center of the work transport unit I or J. In step S13, it is determined whether the work transport unit I or K that has detected the pod 1 is the branch-point transport unit J. If YES in step S13, the process advances to step S15 to execute branch-point transport unit control processing to be described later. Otherwise, the process advances to step S14 to execute unidirectional transport unit control processing to be described later. In step S16, another processing is executed, and the processing of one unit is thus ended. The CPU 61 returns to step S11 to repeat the same processing as described above.

Figure 7:
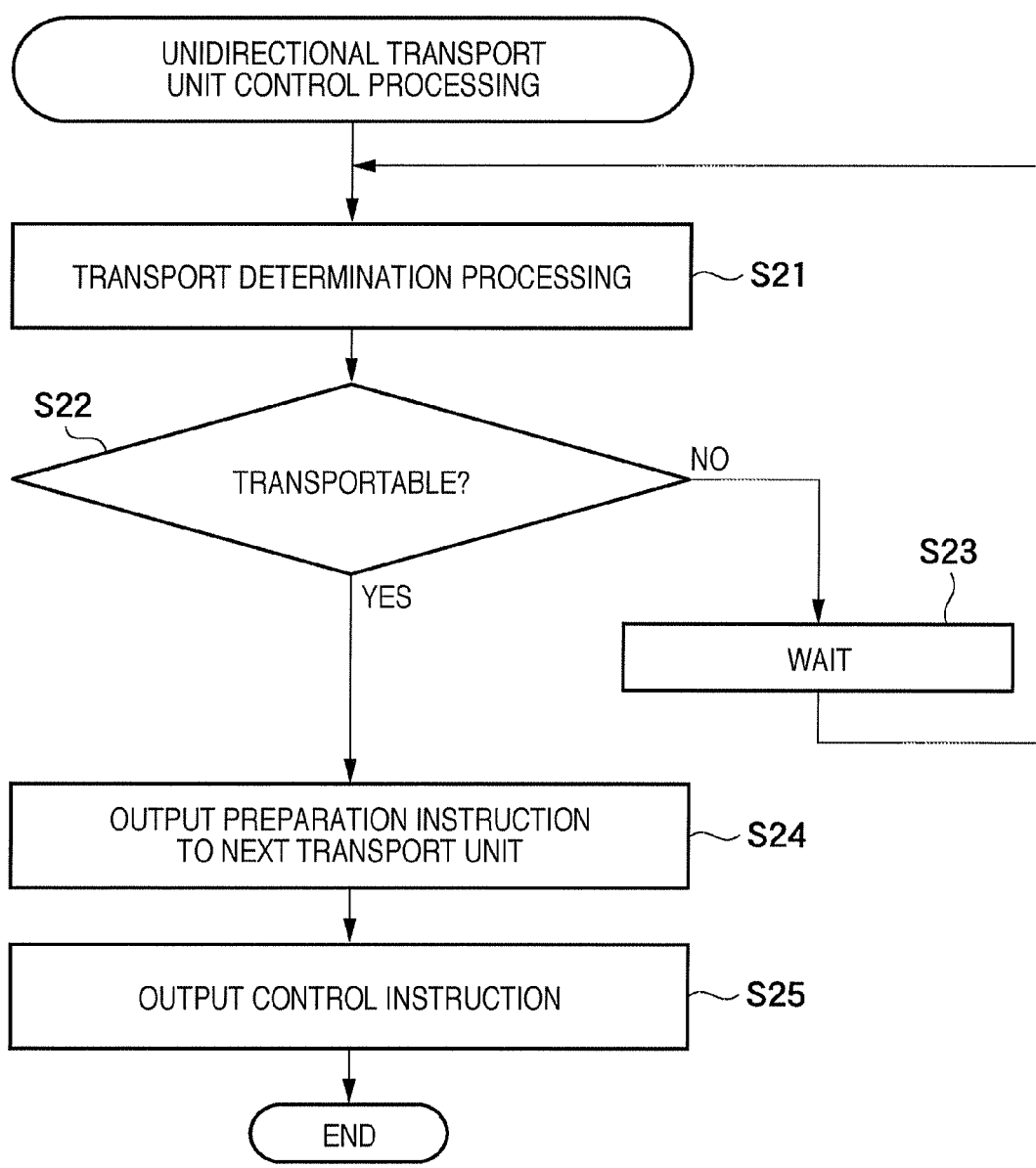
FIG. 7 is a flowchart illustrating unidirectional transport unit control processing in step S14.

FIG. 7 is a flowchart illustrating unidirectional transport unit control processing in step S14. In step S21, transport determination processing is performed. It is determined whether the branch-point transport unit J which is the next work transport unit can receive the pod 1 (is not transporting another pod 1). If the next branch-point transport unit J is the control target of the control unit 60, the determination is done by checking the state of the branch-point transport unit J. If the next branch-point transport unit J is the control target of another control unit 60, the determination is done by inquiring of the other control unit 60 via the communication channel 3.

If it is determined in step S22 based on the determination result in step S21 that the pod 1 can be transported to the next branch-point transport unit J, the process advances to step S24. Otherwise, the process advances to step S23. In step S23, the process waits for a predetermined time and then returns to step S21. That is, the process waits for transport of the pod 1.

In step S24, a preparation instruction is output to the branch-point transport unit J that is the next work transport unit. In this step, control is performed to change the direction of the branch-point transport unit J to receive the pod 1. If the next branch-point transport unit J is the control target of another control unit 60, the preparation instruction is output to the other control unit 60 via the communication channel 3.

In step S25, a control instruction is output to the unidirectional transport unit I that is the current control target, thereby controlling to transport the pod 1 to the next branch-point transport unit J. The processing of one unit is thus ended.

Figure 8:
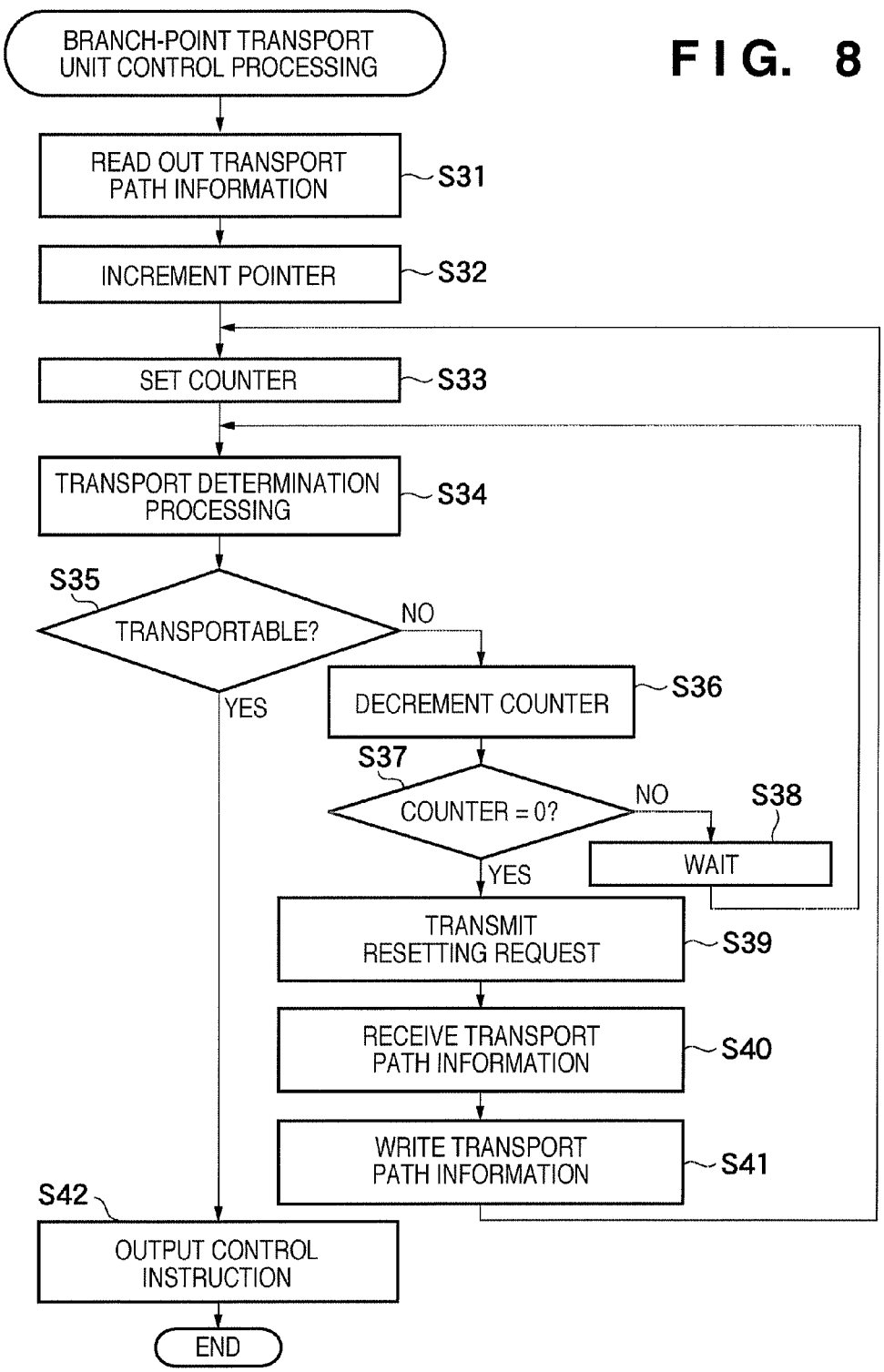
FIG. 8 is a flowchart illustrating branch-point transport unit control processing in step S15.

FIG. 8 is a flowchart illustrating branch-point transport unit control processing in step S15. In step S31, the reader/writer 22 reads out transport path information from the memory 201a of the wireless IC tag 2 of the pod 1. That is, the reader/writer 22 functions as a read means for reading out transport path information from the memory 201a which stores the transport path information when the pod 1 has arrived at a branch point of the transport path. The readout of the transport path information is done by reading out a pointer from address 0001 of the memory 201a and reading out data stored at the address indicated by the pointer.

In step S32, the reader/writer 22 increments the value of the pointer stored in the memory 201a of the wireless IC tag 2 of the pod 1 by one and writes the pointer. The value of the pointer represents the transport direction of the next branch-point transport unit J.

In step S33, the counter is set to the initial value. The counter is a software counter to be used to determine whether to send a transport path resetting request of the pod 1 to the host computer 50. The initial value is, for example, 3.

In step S34, transport determination processing is performed. It is determined whether the unidirectional transport unit I which is the next work transport unit can receive the pod 1 (is not transporting another pod 1). As in step S21, if the next unidirectional transport unit I is the control target of the control unit 60, the determination is done by checking the state of the unidirectional transport unit I. If the unidirectional transport unit I is the control target of another control unit 60, the determination is done by inquiring of the other control unit 60 via the communication channel 3.

If it is determined in step S35 based on the determination result in step S34 that the pod 1 can be transported to the next unidirectional transport unit I, the process advances to step S42. Otherwise, the process advances to step S36. In step S36, the value of the counter in which the initial value has been set in step S33 is decremented by one. In step S37, it is determined whether the counter value is 0. If YES in step S37, the process advances to step S39. Otherwise, the process advances to step S38. In step S38, the process waits for a predetermined time and then returns to step S34. That is, the process waits for transport of the pod 1.

In step S39, a transport path resetting request is transmitted to the host computer 50 via the communication channel 3. More specifically, in this embodiment, if the wait processing in step S38 has been executed a number of times corresponding to the initial value of the counter set in step S33, it is determined that some failure such as a delay or malfunction has occurred in the transport path downstream of the current position of the pod 1, and the transport path is reset.

In step S40, the reset transport path information is received from the host computer 50 via the communication channel 3. In step S41, the reader/writer 22 writes the reset transport path information in the memory 201a of the wireless IC tag 2. That is, the reader/writer 22 functions as a write means for writing the transport path information based on the reset transport path in the memory 201a halfway through the transport path. Then, the process returns to step S33.

In step S42, a control instruction is output to the branch-point transport unit J that is the current control target, thereby controlling to transport the pod 1 to the next unidirectional transport unit I. More specifically, the branch-point transport unit J is controlled to transport the pod 1 in the transport direction represented by the transport path information read out in step S31 (or the reset transport path information received in step S40). The processing of one unit is thus ended.

As described above, in the work transport system 100 of this embodiment, the transport equipment 10 forms a plurality of transport paths from the apparatuses A to E serving as transport sources to the apparatuses a to e serving as transport destinations. Since a plurality of choices exists as the transport path of the pod 1, the work transport efficiency can be increased.

Transport control of the pod 1 is performed based on transport path information stored in the memory 201*a* of the wireless IC tag 2 attached to the pod 1. This obviates the need to cause the control unit 60 to inquire of the host computer 50 about the transport direction of the pod 1 every time the pod 1 has arrived at the branch-point transport unit J. It is therefore possible to reduce the load on the host computer 50 as compared to a system which causes the host computer 50 to unitarily manage work transport paths and execute control.

Since transport path information represents the transport direction of the pod 1 at a branch point in the transport path, the logic of transport control of the pod 1 can be simplified. That is, the processing of determining and setting the work transport direction at each branch point in the transport path is unnecessary, and the transport control processing can be simplified. For example, when transport path information represents processes the pod 1 should undergo, the control unit 60 must determine and set the transport direction according to the next process. In this embodiment, however, since transport path information represents the transport direction of the pod 1, the determination and setting are unnecessary.

Since transport path information represents the transport direction of the pod 1, the system can flexibly cope with a change in the system layout. For example, when transport path information represents processes the pod 1 should undergo, it is necessary to set in advance, in each control unit 60, the relationship between the layout of the transport equipment 10 and the position of each transport destination. When the system layout has changed, the relationship must be reset in each control unit 60. In this embodiment, however, the resetting is unnecessary.

If it is difficult to transport the pod 1 via the transport path set first, the transport path is reset. This makes it possible to timely change the transport path of the pod 1 and raise the transport efficiency. The reset transport path information has the same structure as that of the transport path set first. Hence, a common transport control logic can be used for initial setting and resetting of the transport path, and the transport control can be simplified.

The present invention is applicable to any processing other than transport of an object to be transported in facilities such as production facilities, processing facilities, or inspection facilities where an object to be transported is generally called a work. For example, the present invention is also applicable to transport of goods as an object to be transported in physical distribution facilities for, for example, the assortment of goods.

The invention claimed is:

1. A transport system, comprising:
a transporter including a plurality of transport paths from a transport source to a transport destination for transporting a work via a transport path selected from the plurality of transport paths, said transporter including branch-point transport units which are arranged at branch points in the transport path for changing a transport direction of the work;
a host computer which sets the transport path of the work from the plurality of transport paths;
a controller for controlling said transporter; and a storage medium provided on the work, the storage medium containing transport path information;
readers arranged at the branch points in the transport path for reading out transport path information from the storage medium provided on the work; and
writers arranged at the branch points in the transport path and accessible to the storage medium;
wherein said transport path information includes a transport direction of the work for each branch-point transport unit through which the work should pass,
wherein when the work has arrived at one of the branch points, said controller refers to the transport path information read out by said reader at the one of the branch points and controls said branch-point transport unit at the one of the branch points to transport the work in the transport direction which is represented by the transport path information for the one of the branch points,
the transport path information is stored in the storage medium at a storage address set in order of the branch-point transport units through which the work should pass,
the storage medium stores a pointer to refer to the storage address,
wherein the storage address corresponding to the branch-point transport unit through which the work should pass first is set as an initial value of the pointer, and
the value is incremented every time the work passes through the branch-point transport unit by said writer at the branch point through which the work passes.

2. The transport system according to claim 1, further comprising a transport path writer for writing, in the storage medium at the transport source, the transport path information based on the transport direction of the work set by said host computer.

3. The transport system according to claim 2, wherein
said host computer resets the transport path of the work during transport, and
said writers at the branch points write, in the storage medium, the transport path information based on the reset transport path.

4. The transport system according to claim 1, wherein
the work is stored in a container for storing the work and transported, and
the storage medium is provided on the container.

5. A transport system comprising:
transport means for forming a plurality of transport paths from a transport source to a transport destination and transporting a work via a transport path selected from the plurality of transport paths, said transport means including branch-point transport units which are arranged at branch points in the transport path for changing a transport direction of the work;
a host computer which sets the transport path of the work from the plurality of transport paths,
control means for controlling said transport means; a storage medium provided on the work, the storage medium containing transport path information;
readers arranged at the branch points in the transport path for reading out transport path information from the storage medium provided on the work; and
writers arranged at the branch points in the transport path and accessible to the storage medium,
wherein said transport path information includes a transport direction of the work for each branch-point transport unit through which the work should pass, and wherein when the work has arrived at one of the branch points, said control means refers to the transport path information read out by said reader at the one of the branch points and controls said branch-point transport unit at the one of the branch points to transport the work in the transport direction which is represented by the transport path information for the one of the branch points, wherein the transport path information is stored in the storage medium at a storage address set in an order of the branch-point transport units through which the work should pass, the storage medium stores a pointer to refer to the storage address, the storage address corresponding to the branch-point transport unit through which the work should pass first is set as an initial value of the pointer, and the value is incremented every time the work passes through the branch-point transport unit by said writer at the branch point through which the work passes.

6. The transport system according to claim 5, further comprising transport path write means for writing, in the storage medium at the transport source, the transport path information based on the transport direction of the work set by said host computer.

7. The transport system according to claim 6, wherein said host computer resets the transport path of the work during transport, and said writers at the branch points write, in the storage medium, the transport path information based on the reset transport path.

8. The transport system according to claim 5, wherein the work is stored in a container for storing the work and transported, and the storage medium is provided on the container.

9. The transport system according to claim 5, wherein said control means waits for a predetermined time when said control means determines that the work cannot be transport from said branch-point transport unit at the one of the branch points to a next unit in said transport means, said control means requests the host computer to reset the transport path of the work when said control means determines that the work cannot be transported from said branch-point transport unit at the one of the branch points to the next unit after the predetermined time, said host computer resets the transport path and transmits the reset transport path to the control means, said writer writes, in the storage medium on the work to be transported by said branch-point transport unit at the one of the branch points, new transport path information based on the reset transport path, and said control means controls said branch-point transport unit at the one of the branch points to transport the work in the transport direction which is represented by the new transport path information.

10. The transport system according to claim 5, wherein the transport direction is represented by an orientation in a factory where said transport system is installed.

* * * * *